United States Patent
Sarkinen et al.

(10) Patent No.: US 7,099,275 B2
(45) Date of Patent: Aug. 29, 2006

(54) PROGRAMMABLE MULTI-SERVICE QUEUE SCHEDULER

(75) Inventors: Scott A. Sarkinen, Mounds View, MN (US); Scott A. Davidson, Savage, MN (US)

(73) Assignee: SLT Logic LLC, Boston, MA (US)

(*) Notice: Subject to any disclaimer, the term of this patent is extended or adjusted under 35 U.S.C. 154(b) by 998 days.

(21) Appl. No.: 09/957,750

(22) Filed: Sep. 21, 2001

(65) Prior Publication Data

US 2003/0063562 A1  Apr. 3, 2003

(51) Int. Cl.
- H04L 12/26 (2006.01)
- H04J 1/16 (2006.01)
- G08C 15/00 (2006.01)
- G06F 11/00 (2006.01)
- G01R 31/08 (2006.01)

(52) U.S. Cl. .................. 370/230; 370/252; 370/412

(58) Field of Classification Search ........ 370/229–252, 370/395–429, 230–234; 709/202–223
See application file for complete search history.

(56) References Cited

U.S. PATENT DOCUMENTS

| | | | |
|---|---|---|---|
| 5,231,633 A | 7/1993 | Hluchyj et al. | |
| 5,260,935 A | 11/1993 | Turner | |
| 5,268,900 A | 12/1993 | Hluchyj et al. | |
| 5,455,825 A | 10/1995 | Lauer et al. | |
| 5,570,360 A | 10/1996 | Klausmeier et al. | |
| 5,579,312 A | 11/1996 | Ragache | |
| 5,629,936 A | 5/1997 | Lee et al. | |
| 5,781,531 A | 7/1998 | Charny | |
| 5,864,540 A | 1/1999 | Bonomi et al. | |
| 5,870,396 A | 2/1999 | Abu-Amara et al. | |
| 5,870,629 A | 2/1999 | Borden et al. | |
| 5,923,656 A | 7/1999 | Duan et al. | |
| 6,018,527 A | 1/2000 | Yin et al. | |
| 6,021,116 A | 2/2000 | Chiussi et al. | |
| 6,052,375 A * | 4/2000 | Bass et al. | 370/412 |
| 6,067,298 A | 5/2000 | Shinohara | |
| 6,072,800 A | 6/2000 | Lee | |
| 6,104,700 A * | 8/2000 | Haddock et al. | 370/235 |
| 6,108,305 A | 8/2000 | Charny et al. | |
| 6,118,761 A * | 9/2000 | Kalkunte et al. | 370/229 |
| 6,130,878 A | 10/2000 | Charny | |

(Continued)

OTHER PUBLICATIONS

"Asynchronous Transfer Mode (ATM)," http://iwander.vlsi.uiuc.edu/abr/atmintro.html, printed Apr. 26, 2001, pp. 1-5.

(Continued)

Primary Examiner—Man U. Phan
(74) Attorney, Agent, or Firm—Patterson, Thuente, Skaar & Christensen, P.A.

(57) ABSTRACT

A system and method for scheduling data utilizes a number of queues for receiving data. A programmable criteria table comprises a number of entries each associated with one of the queues. The entries of the criteria table comprise programmable traffic parameters selected to associate the queues with particular traffic characteristics governing a flow of data through the queues. A programmable mapping table maps each of the queues to one of the criteria table entries. The criteria table is programmable independently from the mapping table. A scheduling period timer produces epoch time signals that define scheduling time periods. The scheduling of queues changes between scheduling time periods in accordance with the traffic parameters associated with the queues. The scheduling time period is dynamically programmable. The traffic parameters are dynamically programmable to alter a scheduling prioritization of the queues.

18 Claims, 12 Drawing Sheets

U.S. PATENT DOCUMENTS

| | | | |
|---|---|---|---|
| 6,141,355 | A | 10/2000 | Palmer et al. |
| 6,192,406 | B1 | 2/2001 | Ma et al. |
| 6,430,154 | B1* | 8/2002 | Hunt et al. ............... 370/230.1 |
| 6,728,253 | B1* | 4/2004 | Jeffries et al. ............... 370/412 |
| 6,934,294 | B1* | 8/2005 | Bertagna ................... 370/412 |
| 6,947,996 | B1* | 9/2005 | Assa et al. .................. 709/232 |
| 2001/0004362 | A1 | 6/2001 | Kamiya |
| 2002/0075803 | A1* | 6/2002 | Zaharychuk et al. ........ 370/231 |
| 2002/0141427 | A1* | 10/2002 | McAlpine ................... 370/413 |

OTHER PUBLICATIONS

"Introduction to ABR," http://iwander.vlsi.uiuc.edu/abr/abrintro. html, printed Apr. 26, 2001, pp. 1-4.

"The Virtual Output Queue," http://iwander.vlsi.uiuc.edu/abr/virtqueue.html, printed Apr. 26, 2001, pp. 1-7.

"Simulation Results," http://iwander.vlsi.uiuc.edu/abr/simulation_results.html, printed Apr. 26, 2001, pp. 1-4.

"ABR Architecture And Simulation For an Input-Buffered And Per-VC Queued ATM Switch, " Bossardt et al., Dept. of Electrical and Computer Engineering, Univ. of IL, Feb. 1998.

"Reinventing The Switch Fabric Architecture," Communication System Design, http://www.csdmag.com/story/OEG20010521S0113, Jun. 1, 2001.

William Wong, "Network Processors Take The High Road . . . And The Low Road," Electronic Design, Jul. 10, 2000, http://www.planetee.com/planetee/servlet/DisplayDocument?ArticleID=6798, Retrieved Jun. 15, 2001, pp. 1-3.

"Network Processors Take The High Road . . . And The Low Road," Electronic Design, Jul. 10, 2000, http://www.planetee.com/planetee/servlet/DisplayDocument?ArticleID=6799 , Retrieved Jun. 15, 2001, pp. 1-2.

"Network Processors Take The High Road . . . And The Low Road," Electronic Design, Jul. 10, 2000, http://www.planetee.com/planetee/servlet/DisplayDocument?ArticleID=6800, Retrieved Mar. 7, 2002, 3 pgs.

"Network Processors Take The High Road . . . And The Low Road, " Electronic Design, Jul. 10, 2000, http://www.planetee.com/planetee/servlet/DisplayDocument?ArticleID=6802 , Retrieved Jun. 15, 2001, 1 pg.

"Network Processors Take The High Road . . . And The Low Road, " Electronic Design, Jul. 10, 2000, http://www.planetee.com/planetee/servlet/DisplayDocument?ArticleID=6804, Retrieved Jun. 15, 2001, 1 pg.

"Network Processors Take The High Road . . . And The Low Road," Electronic Design, Jul. 10, 2000, http://www.planetee.com/planetee/servlet/DisplayDocument?ArticleID=6806, Retrieved Jun. 15, 2001, 1 pg.

"Network Processors Take The High Road . . . And The Low Road," Electronic Design, Jul. 10, 2000, http://www.planetee.com/planetee/servlet/DisplayDocument?ArticleID=6808, Retrieved Jun. 15, 2000, 1 pg.

"Products," Applications, C-PORT, A Motorola Company, http://www.cportcorp.com/products/applications.htm, Retrieved Jan. 23, 2001, pp. 1-3.

"C-5™ Digital Communications Processor," C-PORT, A Motorola Company, Product Brief, Date Unknown, 8 pgs.

David Husak, "Network Processors: A Definition and Comparison," C-PORT, A Motorola Company, Date Unknown, pp. 1-8.

Husak et al., "Network Processor Programming Models: The Key to Achieving Faster Time-to-Market and Extending Product Life," C-PORT, A Motorola Company, Date Unknown, 8 pgs.

"Products," Applications, C-PORT, A Motorola Company, http://www.cportcorp.com/products/applications.htm, Retrieved Jan. 23, 2001, pp. 1-3.

* cited by examiner

PROGRAMMABLE MULTI-SERVICE QUEUE SCHEDULER

CROSS-REFERENCE TO OTHER PATENT APPLICATIONS

The following co-pending application of common assignee contains some common disclosure: MULTI-SERVICE SWITCH FABRIC PROCESSING SYSTEM AND METHOD, application Ser. No. 09/957,751, filed Sep. 21, 2001, which is incorporated herein by reference in its entirety.

FIELD OF THE INVENTION

This invention relates in general to communication networks, and, more particularly, to a method and apparatus for scheduling network data using a highly programmable, flexible queue architecture and methodology.

BACKGROUND OF THE INVENTION

The advancement and improvement of networking technologies is a perpetual goal of the communications industry. As raw speeds of large-scale and personal computing devices soar, the tremendous increase in data transmission demand continues to push the networking bandwidth envelope to capacity. Technological advances, together with the ever-increasing demand for communicating bandwidth-intensive multimedia content, continually escalate the need for higher bandwidth broadband systems.

The term "broadband" has often been used to describe high-bandwidth transmission of data signals, such as data, video, voice, video conferencing, etc. Broadband philosophies often address networking principles applicable to the backbone of the networking system, since the networking backbone generally faces the highest bandwidth demands. There are many competing technologies for delivering broadband access. For example, there are a number of standards used in digital telecommunications, including TCP/IP (Transmission Control Protocol/Internet Protocol), Ethernet, HDLC (High-level Data Link Control), ISDN (Integrated Services Digital Network), ATM (Asynchronous Transfer Mode), X.25, Frame Relay, Digital Data Service, FDDI (Fiber Distributed Data Interface), T1, xDSL (x Digital Subscriber Line), Wireless, Cable Modems, and Satellite among others.

Many of these standards employ different packet and/or frame formats. The term "frame" is often used in reference to encapsulated data at OSI layer 2, including a destination address, control bits for flow control, the data or payload, and CRC (cyclic redundancy check) data for error checking. The term "packet" is often used in reference to encapsulated data at OSI layer 3. Further, the term "cell" is often used in reference to a group of bytes/octets conditioned for transmission across a network. However, it should be understood that for purposes of the present application, the terms packet, frame, and cell may be used interchangeably to refer to groups or collections of data. Further, a packet format or frame format generally refers to how data is encapsulated with various fields and headers for transmission across the network. For example, a data packet typically includes a destination address field, a length field, an error correcting code (ECC) field or cyclic redundancy check (CRC) field, as well as headers and trailers to identify the beginning and end of the packet. The terms "packet format" and "frame format," also referred to as "cell format," are generally synonymous for purposes of this application.

Packets transmitted across a network are associated with a transmission protocol. A protocol is a set of rules that governs how devices on a network exchange information. Packets traversing the network may be of differing formats or protocols. Examples of typical protocols used to communicate information include the Internet Protocol (IP), which is a "best-effort," connectionless protocol responsible for delivering data from host to host across a network such as the Internet. IP is a predominant protocol used to transmit data across the Internet.

Other protocols are used to transmit packets across the Internet as well, such as Framed ATM over SONET/SDH Transport (FAST) and IP on multiprotocol label switching (MPLS). FAST is a new protocol intended to improve the performance of asynchronous transfer mode (ATM). FAST introduces a variable length user data field, while preserving the proven advantages of ATM, such as real quality of service guarantees, the security and traffic isolation provided by virtual connections, network management, traffic management, control mechanisms for bandwidth on demand, etc. MPLS integrates layer-2 information about network links into layer-3 (IP) within a particular autonomous system in order to simplify and improve IP-packet exchange. MPLS essentially provides connection-oriented labeling in an otherwise connectionless environment, which has resulted in MPLS being considered associated with layer-2.5. With MPLS, different flows can be classified, and different service levels can be associated with the different flow classifications.

Numerous scheduling techniques have been developed to manage the confluence of network traffic flows at a common node, such as a router, for example. Conventional scheduling techniques attempt to manage network traffic using various traffic shaping approaches, such as those employing a "round-robin" scheduling algorithm or "leaky bucket" scheduling algorithm, for example. The ATM protocol, for example, utilizes a small number of queues with fixed Quality of Service (QOS) parameters. These and other known scheduling schemes have various deficiencies when applied in the context of multi-service applications, such as when scheduling multi-service network traffic containing variable length packets across a backplane or network interface.

There is a need in the communications industry for an improved method and apparatus for shaping network traffic. There is a particular need for such a method and apparatus that provides for enhanced scheduling of ingress and egress queues in the context of a multi-service network traffic environment. The present invention fulfills these and other needs, and offers other advantages over prior art scheduling approaches.

SUMMARY OF THE INVENTION

The present invention is directed to a system and method for scheduling data. According to one embodiment of the present invention, data cells are received by a number of queues. The data cells typically represent variable length data, but may also represent fixed length data or a combination of variable and fixed length data. The queues may be ingress or egress queues. A number of alterable traffic parameters associated with each of the queues are read. The alterable traffic parameters are selected to associate a particular queue with particular traffic characteristics. The queues are scheduled for output using the read alterable traffic parameters.

The traffic parameters are alterable to associate a particular queue with one or more of a particular Quality of Service (QOS), a particular traffic type, or queue scheduling prioritization, for example. The traffic parameters associated with each queue preferably include a traffic parameter that defines a bandwidth limit for each queue.

The queues, for example, may first be prioritized on the basis of real time versus best effort traffic, with real time traffic having priority over best effort traffic. The queues subject to this first level of prioritization are typically further prioritized based on other traffic or system considerations. The traffic parameters that govern scheduling of the queues are alterable so as to alter a scheduling prioritization of the queues.

The method may further involve mapping a set of alterable traffic parameters to each of the queues. This mapping of the set of traffic parameters may be altered. The set of traffic parameters may also be altered, independent or in conjunction with altering the mapping of the set of traffic parameters.

In accordance with another embodiment of the present invention, a method of scheduling data to achieve desired traffic characteristics involves receiving data by a number of queues and reading a set of traffic parameters associated with each of the queues. The queues are scheduled for output during each of a number of scheduling time periods. The scheduling of the queues changes between scheduling time periods in accordance with the traffic parameters to achieve the desired traffic characteristics. The traffic parameters associated with the queues are dynamically alterable. A duration of the scheduling time period may also be altered.

The set of traffic parameters associated with each queue preferably includes a Skip Count parameter. Scheduling the queues further involves skipping a particular queue during a particular scheduling time period in accordance with the Skip Count parameter associated with the particular queue. For example, scheduling the queues may involve skipping a particular queue during a predefined scheduling time period in accordance with the Skip Count parameter associated with the particular queue, and scheduling the particular queue for output during scheduling time periods other than the predefined scheduling time period as indicated by the Skip Count parameter associated with the particular queue.

The set of traffic parameters associated with each queue may further include a Schedule Count or Hit parameter. Scheduling the queues further involves considering a particular queue for scheduling a predefined number of times during each scheduling time period in accordance with the Schedule Count parameter associated with the particular queue. For example, scheduling the queues may involve considering particular queues for scheduling a predefined or unbounded number of times during each scheduling time period in accordance with the Schedule Count parameter associated with the particular queues. A particular queue, for example, is considered for scheduling an unbounded number of times in accordance with the Schedule Count parameter and priority associated with the particular queue and a Schedule Count parameter and priority associated with queues other than the particular queue.

According to a further embodiment of the present invention, a system for scheduling data interacts with a number of queues for receiving data. A programmable criteria table comprises a number of entries each associated with one of the queues. The entries of the criteria table comprises programmable traffic parameters selected to associate the queues with particular traffic characteristics governing a flow of the received data through the queues. A programmable mapping table maps each of the queues to one of the criteria table entries. The criteria table is programmable independently from the mapping table.

The system further includes a scheduling period timer. The scheduling period timer produces epoch time signals. A scheduling time period is defined as a duration of time between consecutive epoch time signals. The scheduling of queues changes between scheduling time periods in accordance with the traffic parameters associated with the queues. The scheduling time period is dynamically programmable. The traffic parameters are dynamically programmable to alter a scheduling prioritization of the queues.

The programmable criteria table utilizes one or more pointers. A pointer, during a particular scheduling time period, advances through all entries of the criteria table according to a first sequence. During a remaining portion of the particular scheduling time period, the pointer advances through the entries of the criteria table according to a second sequence. The second sequence may be the same as the first sequence. Alternatively, the second sequence may be different from the first sequence.

The first sequence preferably represents a sequence through the criteria table entries based on queue priority. For example, the first sequence represents a sequence through the criteria table entries based on highest to lowest queue priority. In one configuration, the second sequence represents a sequence through the criteria table entries that begins at a pointer location at which a previous scheduling time period terminated.

The system may further include a scoreboard table. The scoreboard table comprises a number entries each associated with one of the queues. Each of the scoreboard table entries indicates the present availability of data in an associated queue. Entries of the criteria table associated with scoreboard table entries indicating unavailability of data in an associated queue are skipped from scheduling consideration.

These and various other advantages and features of novelty which characterize the invention are pointed out with particularity in the claims annexed hereto and forming a part hereof. However, for a better understanding of the invention, and its advantages, reference should be made to the drawings which form a further part hereof, and to accompanying descriptive matter, in which there are illustrated and described specific non-limiting examples of apparatuses and methods in accordance with the principles of the present invention.

BRIEF DESCRIPTION OF THE DRAWINGS

The invention is described in connection with the embodiments illustrated in the following diagrams.

Figure 1:
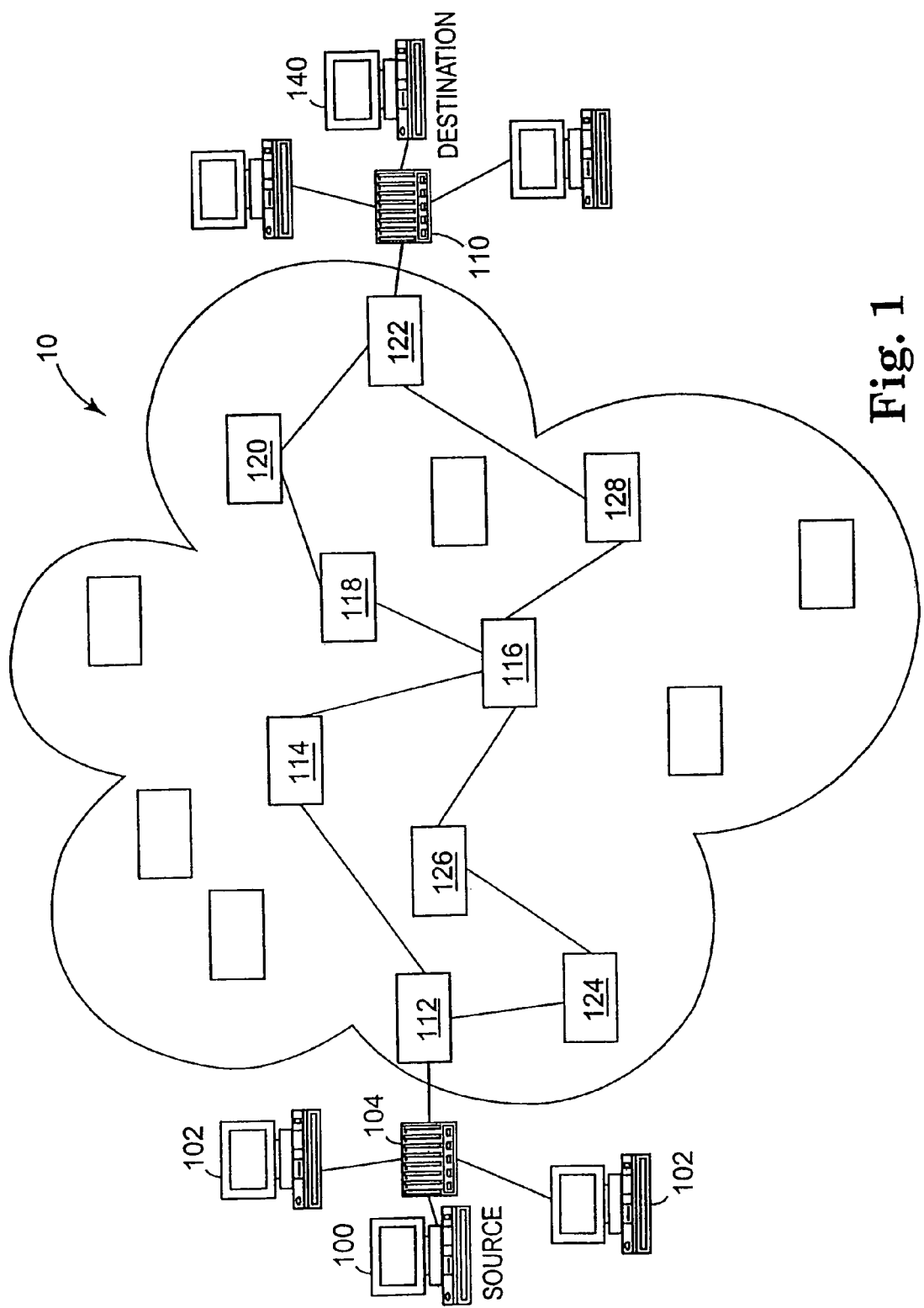
FIG. 1 is a block diagram illustrating a networking environment in which the principles of the present invention may be applied.

While the invention is amenable to various modifications and alternative forms, specifics thereof have been shown by way of example in the drawings and will be described in detail hereinbelow. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF VARIOUS EMBODIMENTS

In the following description of exemplary embodiments, reference is made to the accompanying drawings which form a part hereof, and in which is shown by way of illustration various specific embodiments in which the invention may be practiced. It is to be understood that other embodiments may be utilized, as structural and operational changes may be made without departing from the scope of the present invention.

Generally, the present invention provides a system and method for scheduling packetized data passing through a communication system. More particularly, the present invention is directed to a programmable multi-service queue scheduler that finds particular usefulness when employed in a multi-service fabric processor. A scheduling approach consistent with the principles of the present invention uses programmable tables and scheduling methodologies to arbitrarily configure characteristics of network traffic on a per queue basis. For example, scheduling parameters that impact or shape network traffic, such as the traffic type, priority, and QOS parameters, are configurable on a per queue basis.

A scheduling system and method of the present invention addresses several deficiencies associated with conventional scheduling schemes, particularly those employed in multi-service applications. For example, the present invention solves the problem of scheduling multi-service network traffic containing variable length packets across a backplane or network interface. A scheduler of the present invention meets the requisite QOS requirements of real time traffic by guaranteeing bandwidth and minimizing latency and jitter, while simultaneously fairly scheduling best effort traffic on a programmable priority basis. A scheduling approach consistent with the principles of the present invention solves many problems associated with conventional schemes that utilize a small number of queues with fixed QOS parameters, and renders traditional ATM (Asynchronous Transfer Mode) scheduling techniques that utilize fixed length cells less desirable.

The scheduling system and method of the present invention is preferably implemented to be highly programmable, utilizing a programmable priority based quality of service (QOS) criteria table and a separate programmable queue mapping table. The separate, programmable queue mapping and QOS criteria tables allow the scheduling characteristics of the system to be programmed separately and mapped independently to each queue. This allows the system complete freedom in determined how to queue incoming and outgoing network traffic and independently apply the desired QOS parameters and traffic behaviors of each queue equally well for both real time and best effort types of fixed or variable length packets.

For purposes of describing the various features and advantages realizable when implementing a scheduling approach of the present invention, a network environment within which the scheduling systems and methods disclosed herein may be implemented will now be described. It is understood that the following description is provided for illustrative purposes only, and does not limit the utility or scope of the present invention in other environmental contexts.

Data transmitted over networks such as the Internet 10 may be in the form of e-mail messages, file transfers and downloads, web page loading, graphics, voice, motion video, live audio/video, and the like. The data is generally broken up into a number of data packets, frames, or cells, each of which is assigned a hierarchy of headers to direct the data packet to the desired destination, among other things. Each packet is separately dispatched to the destination, although more than one different route may be taken by the various packets associated with the data.

For example, the source computer 100 of FIG. 1 may be configured in a local area network (LAN) and coupled to other computers 102 via a hub 104. A first one or more data packets may reach the hub 110 of the destination LAN via a first path, through routers 112, 114, 116, 118, 120, and 122. A second one or more data packets may reach the hub 110 via a second path, such as through routers 112, 124, 126, 116, 128, and 122. These different packets may take alternative routes due to equipment congestion or failure of a node, or to load share where possible. The routers associated with the core of the Internet can reconfigure the paths that these packets follow. This is due to the router's ability to analyze the header information corresponding to the data packet and to communicate line condition and other information between routers. The routers handling data at the major traffic points on large networks, such as the Internet, are generally large stand-alone systems. After transmitting the data from node to node through the network, the packets are reassembled at the receiving end and availed to the desired destination system 140.

Because of the enormous bandwidth demands required of routers, a continual emphasis is placed on alleviating data throughput bottlenecks at routers, gateways, bridges, and other intermediate nodes along the network. Because routers take on the task of intercepting, analyzing, and moving on millions of packets per second along the best possible route, the processing occurring at these routers, such as scheduling of packets passing through such routers, must be extremely efficient to avoid loading down the system. The present invention may be used in connection with such routing systems to increase speed and efficiencies of network data throughput.

As will be described more fully below, the present invention may be used with ingress and egress processing engines that interface with switch fabric architectures. In one embodiment of the invention, a fabric processor to effect such an interface that utilizes scheduling systems and methodologies in accordance with the present invention is housed in a package or chip that is coupled to the ingress and egress processor on a line card, and is coupled to a switch fabric through, for example, a backplane. This arrangement, however, is not required, as a fabric processor which incorporates scheduling architecture and techniques of the present invention can be coupled to the relevant modules in any desired manner. The scheduling architecture and methodologies of the present invention enables advanced services to be applied at a wide range of speeds, including speeds of up to 10 Gbps, 40 Gbps, and higher.

Figure 2:
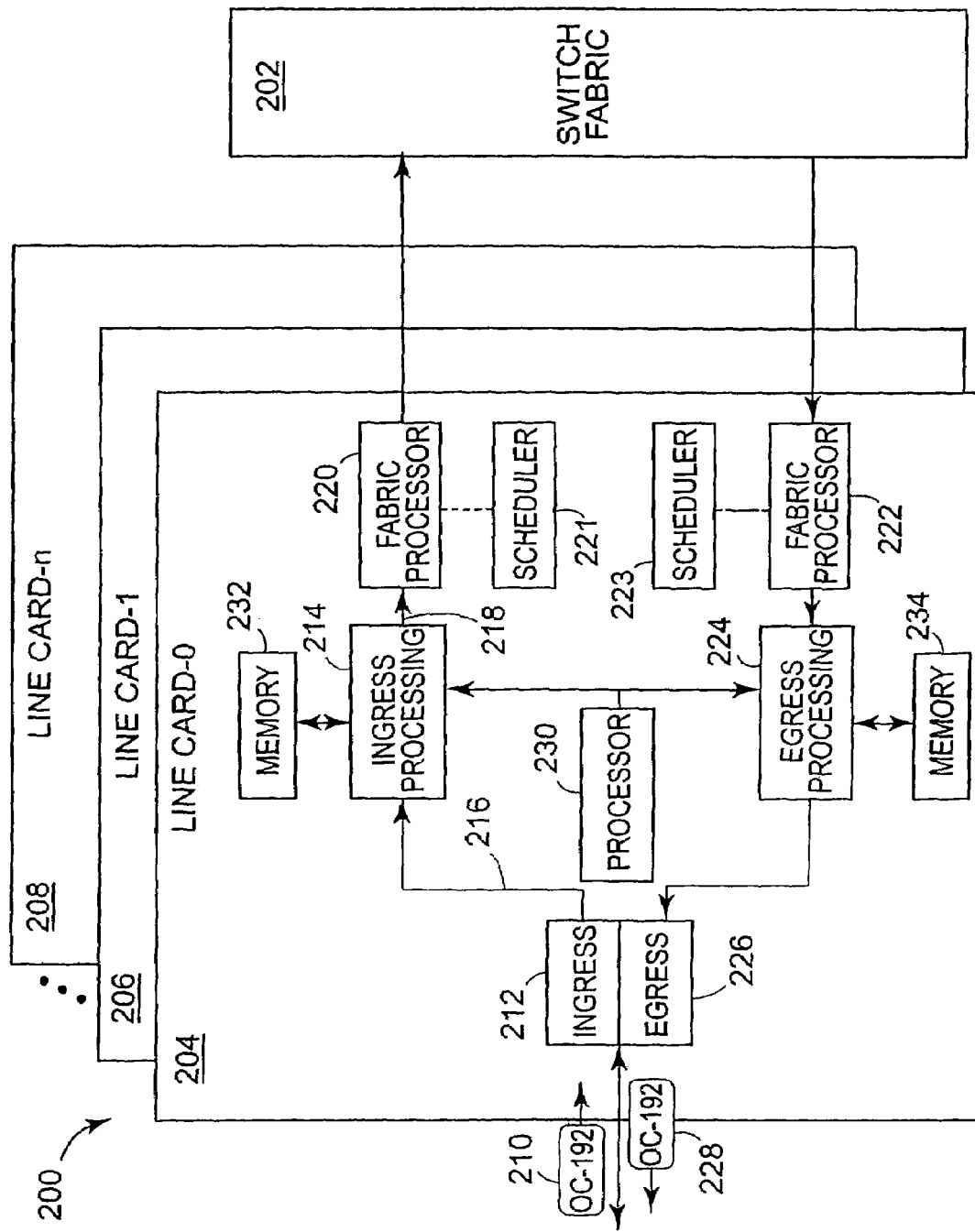
FIG. 2 is a block diagram of an embodiment of a router system in which the present invention may be implemented.
Figure 3:
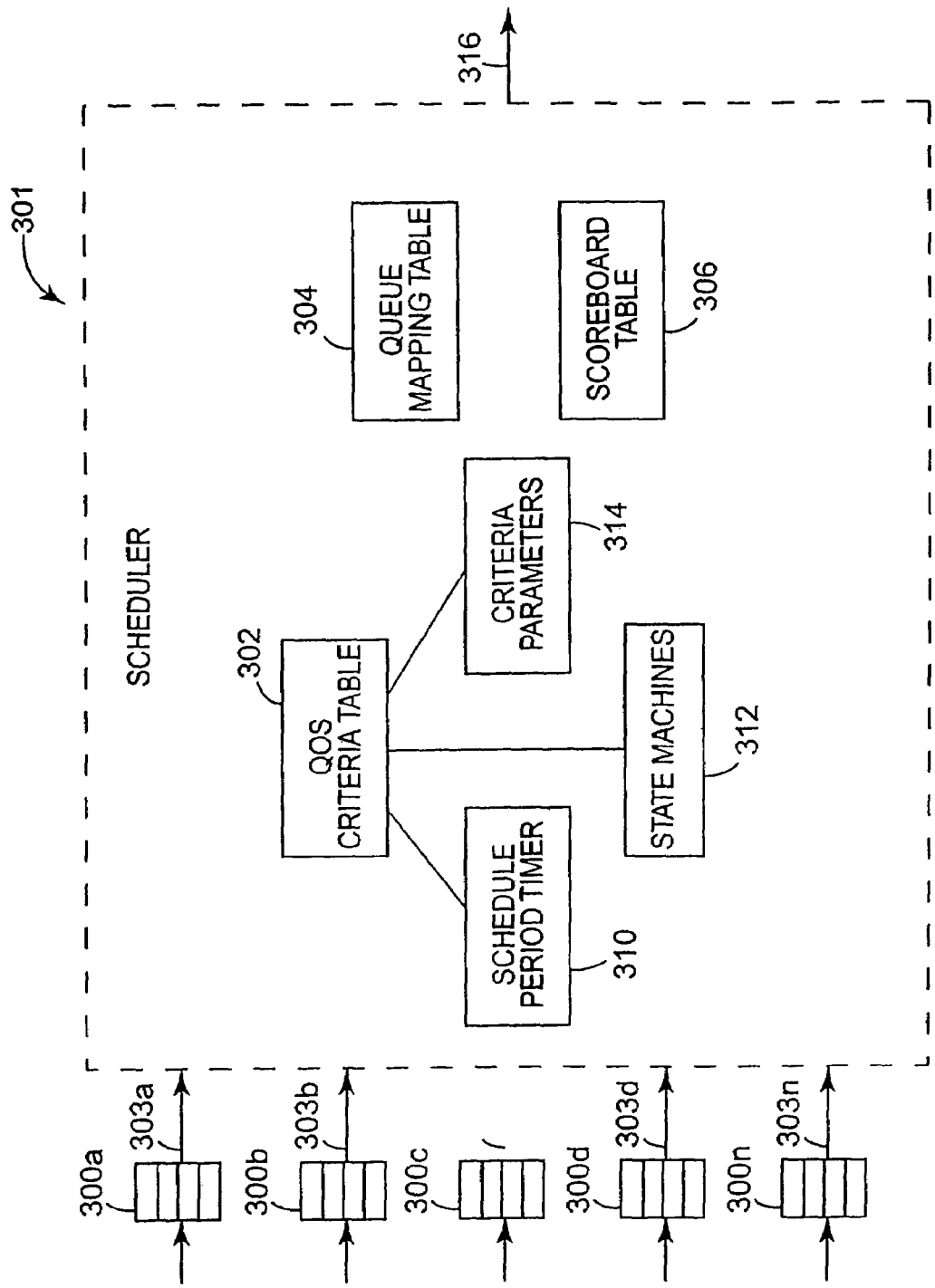
FIG. 3 is a block diagram of a scheduler implemented in accordance with an embodiment of the present invention.

Referring now to FIG. 2, one embodiment of a router system 200 is illustrated in which the present invention may be implemented. One or more line cards are provided, each of which is coupled to a switch fabric 202. Generally, a switch fabric provides a manner of transmitting data packets between any one of a plurality of inputs to any one of a plurality of outputs using a matrix of switch elements. The data packets are routed to the appropriate switch fabric output port based on destination information carried within a header of the packet. Switch fabrics may be single-stage or multi-stage. Because large-scale switching needs may require thousands of input and output ports, multi-stage implementations are generally used for high volume switching needs. These multi-stage switch fabrics include switch elements arranged in multiple stages, compared to single-stage switch designs which connect input and output ports in a single stage. A multi-stage switch fabric is also commonly referred to as Multistage Interconnection Network (MIN). The particular structure of a switch fabric may also be dependent on whether a connection-oriented or connectionless technique is to be employed. Thus, a number of different types and configurations of switch fabrics are known in the art.

In the present example, a plurality of line cards are provided, including line card-0 204, line card-1 206 through a finite number of line cards represented by line card-n 208. In one embodiment of the invention, each of the line cards utilize analogous circuitry. Line card-0 204 will therefore be described, with the understanding that one or more of the remaining line cards in the router system may implement analogous circuitry.

The line card-0 204 in accordance with an exemplary embodiment receives as input packet-over-SONET/SDH (POS) frames via the network. As is known in the art, SONET/SDH is a high-speed time division multiplexing (TDM) physical-layer transport technology. POS provides a means for using the speed and management capabilities of SONET/SDH to optimize data transport, although originally optimized for voice. A SONET/SDH frame is 810 bytes and is normally represented as a two-dimensional byte-per-cell grid of 9 rows and 90 columns. The SONET/SDH frame is divided into transport overhead and payload bytes. The transport overhead bytes include section and line overhead bytes, while the payload bytes are made up of the payload capacity and some additional overhead bytes referred to as path overhead. The overhead bytes are responsible for the management capabilities of SONET/SDH.

The basic transmission rate of SONET (e.g., 51.840 Mbps), referred to as Synchronous Transport Signal level 1 (STS-1), by way of example, is achieved by sampling the 810-byte frames at 8000 frames per second. SONET features an octet-synchronous multiplexing scheme with transmission rates in multiples of 51.840 Mbps, for example, whereby STS-192 thereby provides transmission at approximately 10 Gbps. Packet Over SONET/SDH (POS) allows core routers to send native IP packets directly over SONET/SDH frames. POS provides a relatively low packet overhead and cost per Mbit in comparison to other data transport methods, which allows POS to efficiently support increases in IP traffic over existing and new fiber networks.

As shown in the exemplary embodiment of FIG. 2, incoming POS OC-192 frames 210 originate from another OC-192 device (not shown) and arrive at the line card-0 204 at the ingress framer 212. The frames are transferred to the ingress processing circuit 214 via an interface 216, such as the Optical Internetworking Forum (OIF) System Packet Interface-4 (SPI-4). OIF SPI-4 describes a data path interface between the physical and link layers to support physical line data rates up to 10 Gb/s, and may be used in connection with the present invention, as may other interfaces of appropriate speed.

Ingress processing circuit 214 performs the necessary lookups, policing, and editing of the packet. If necessary, the frame can be redirected to the host processor 230. The frames are fed out of the ingress processing circuit 214 via, for example, an OIF SPI-4 interface 218 to a fabric processor 220 shown in FIG. 2. Generally, the fabric processor 220 converts the data stream from one format to another, such as from POS frames to Common Switch Interface (CSIX) cells, and distributes the cells over the switch fabric 202. The fabric processor 220 is shown to incorporate a scheduler 221, which is the subject of the present invention.

Similarly, packets switched at the switch fabric 202 may be received at the fabric processor 222 and provided to the egress processing circuit 224. Fabric processor 222 is shown to incorporate a scheduler 223, which operates in a manner very similar to that of scheduler 221. The schedulers 221, 223 preferably accommodate multiple service classes, including "best effort" and "rate based" classes, provide weighted fair queuing support, and provide support for strict frame ordering for unicast and multicast traffic. Frames are transferred to the egress framer 226, and output as POS OC-192 frames 228. The processor 230 may be coupled to the ingress processing circuit 214 and the egress processing circuit 224 to perform a variety of functions, including providing coprocessor support. Memories 232, 234 represent one or more memories associated with the ingress processing module 214 and the egress processing module 224, respectively.

One embodiment of the present invention facilitates interfacing with the switch fabric via a CSIX, or Common Switch Interface. The fabric processor 220 circuit and scheduler 221 cooperate to prepare the data for transport via the CSIX (or other) interface to the switch fabric 202, and the fabric processor 222 and scheduler 223 cooperate to reconvert the data from the switch fabric 202 for use by the egress processing system. CSIX is a standard interface between a traffic manager (responsible for ingress and egress data queuing, among other things) and a switch fabric for data communication technologies, such as ATM, IP, MPLS, Ethernet, and similar data communications applications.

The CSIX standard defines the physical and message layers of this interconnect. CSIX provides an interface optimized for the needs of fabric and traffic manager (TM) communication, including unicast addressing for up to 4096 fabric ports, and multiple traffic classes that isolate data going to the same fabric port. Link level flow control is in-band and broken into a data and control queue to isolate traffic based on this granular type. Flow control between the fabric and TM is defined and is relative to both fabric port and class.

A CFrame is the base information unit transferred between Traffic Managers and a CSIX compliant Fabric, referred to herein as a CSIX Fabric. A CFrame includes a header, payload, and a vertical parity trailer. The CFrame Header contains the information fields needed to control the behavior of the Traffic Manger to CSIX Fabric interface. The Payload is variable in length and is passed by the CSIX Fabric from the ingress processing module to the egress processing module. The vertical parity trailer is used for error detection.

A CSIX interface is used where the switch fabric is a CSIX fabric, which is an intelligent switch fabric that schedules, buffers, and switches data between its inputs and outputs. The fabric processor provides the CSIX fabric with information needed to perform scheduling and switching by means of a small CSIX header, which is prepended to the data payload. While the present invention is, in part, described in the context of a CSIX fabric interface for purposes of understanding, it will be readily apparent to those skilled in the art from the description provided herein that the present invention is also applicable to other interface implementations and standards.

Turning now to FIGS. 3–6, there is illustrated a scheduler 301 implemented in accordance with an embodiment of the present invention. In the embodiment depicted in FIGS. 3–6, the scheduler 301 is coupled to a number of queues 300a–n, each of which receives data. It is to be understood that the scheduler 301 of the present invention may process data in a variety of formats, including bytes, cells, packets, and frames of data, for example. It is further understood that the terms describing various data formats may be used interchangeably, and that particular usage of specific data formats is for purposes of illustration only, and not of limitation.

FIGS. 3–6 depict the scheduler 301 as having multiple queue inputs 303a–n and a single output 316. It is understood that more than a single output 316 may be provided in certain configurations. The queues 300a–n are generally representative of either ingress queues or egress queues. Data received by the queues 300a–n, such as cells of data, are transferred to the scheduler architecture 301 via input ports 303a–n. Data scheduled by the scheduler 301 is provided at output 316, such as in the form of a serial stream of packets.

The scheduler 301 is shown in FIGS. 3–6 to include a Quality of Service (QOS) criteria table 302 and a queue mapping table 304. The criteria table 302 is a programmable table that includes n entries, where n represents the number of scheduling events of interest, which, according to the instant embodiment, represents the number of queues 300. In the particular configuration depicted in FIG. 6, for example, the criteria table 302 includes 512 entries which are associated with 512 queues 300. The entries of the criteria table 302 are preferably ordered according to priority, and preferably in descending priority from highest priority (e.g., queue 0) to lowest priority (e.g., queue 511).

Each entry of the criteria table 302 includes a number of programmable traffic parameters 314. In general terms, the traffic parameters and ordering of the entries in the criteria table 302 govern the scheduling of cells received by the queues 300a–n. The traffic parameters and ordering of the entries in the criteria table 302 can be programmed, initially and dynamically, to achieve desired traffic characteristics.

The queue mapping table 304 of the scheduler 301 includes n entries, where n represents the number of queues 300. The queue mapping table 304 maps each of the queues 300 within the system to one of the entries of the criteria table 302. It will be readily appreciated by one skilled in the art that use of the separate, programmable criteria table 302 and queue mapping table 304 advantageously provides for the independent mapping of the queues 300 and scheduling criteria settings on a per queue basis. In other words, use of the programmable criteria table 302 and queue mapping table 304 allows the scheduling characteristics of the system to be programmed separately and mapped independently to each queue 300.

In addition to defining the scheduling characteristics of the queues 300 and cooperating with the queue mapping table 304 to map criteria table entries to the queues 300, the criteria table 302 also determines how much data (i.e., bandwidth) will be scheduled, in terms of bytes, cells or packets, for each scheduling decision. The architecture of the scheduler 301 also includes a scheduling period timer 310 and state machines 312 that cooperate with the criteria table 302 to schedule the data received by the queues 300a–n.

By way of example, at the system level, an engineer developing the control plane software for a given system determines the settings of the queue mapping table 304 and criteria table 302 based on, for example, the type(s) of traffic the system will handle, the number of ports in the system, and the different types of QOS classes/behaviors the system must handle. For example, in a 512 queue system designed to support 128 physical ports, the queue mapping and criteria settings can be configured to allow the system to have four priority queues for each of the 128 physical ports. In a two port system, by way of further example, the settings of the queue mapping table 304 and criteria table 302 can be programmed to provide for 256 priorities/classes for each port.

In general, and according to one scheduling technique of the present invention, a particular queue 300 is actually scheduled when three events occur. A particular queue 300 is actually scheduled when 1) the particular queue 300 has data available to be transferred; 2) the particular queue's criteria is satisfied; and 3) the particular queue has the highest priority relative to all other queues currently containing data and valid criteria. A scoreboard table 306 indicates the availability or unavailability of data for each queue 300. The scoreboard table 306 may receive information from an enqueue engine 402 and dequeue engine 404 of the system concerning the present availability or unavailability of data for each queue 300.

The scoreboard table 306 includes n entries, where n represents the number of queues 300. In one configuration, that data availability state of each entry of the scoreboard table 306 can be represented by a binary 1 or 0. The scoreboard table 306 allows the scheduler 301 to quickly determine the next criteria table entry to schedule without having to scan the entire criteria table 302 at every decision point. Use of the scoreboard table 306 allows for large numbers of queues 300 to be scheduled, while maintaining wire speed performance at high data rates. A data manager 406, shown in FIG. 5, which is shown coupled to the queues 300a–n, scoreboard table 306, criteria table 302 (and mapping table 304 via criteria table 302), typically coordinates the scheduling activities of the scheduler 301.

Figure 4:
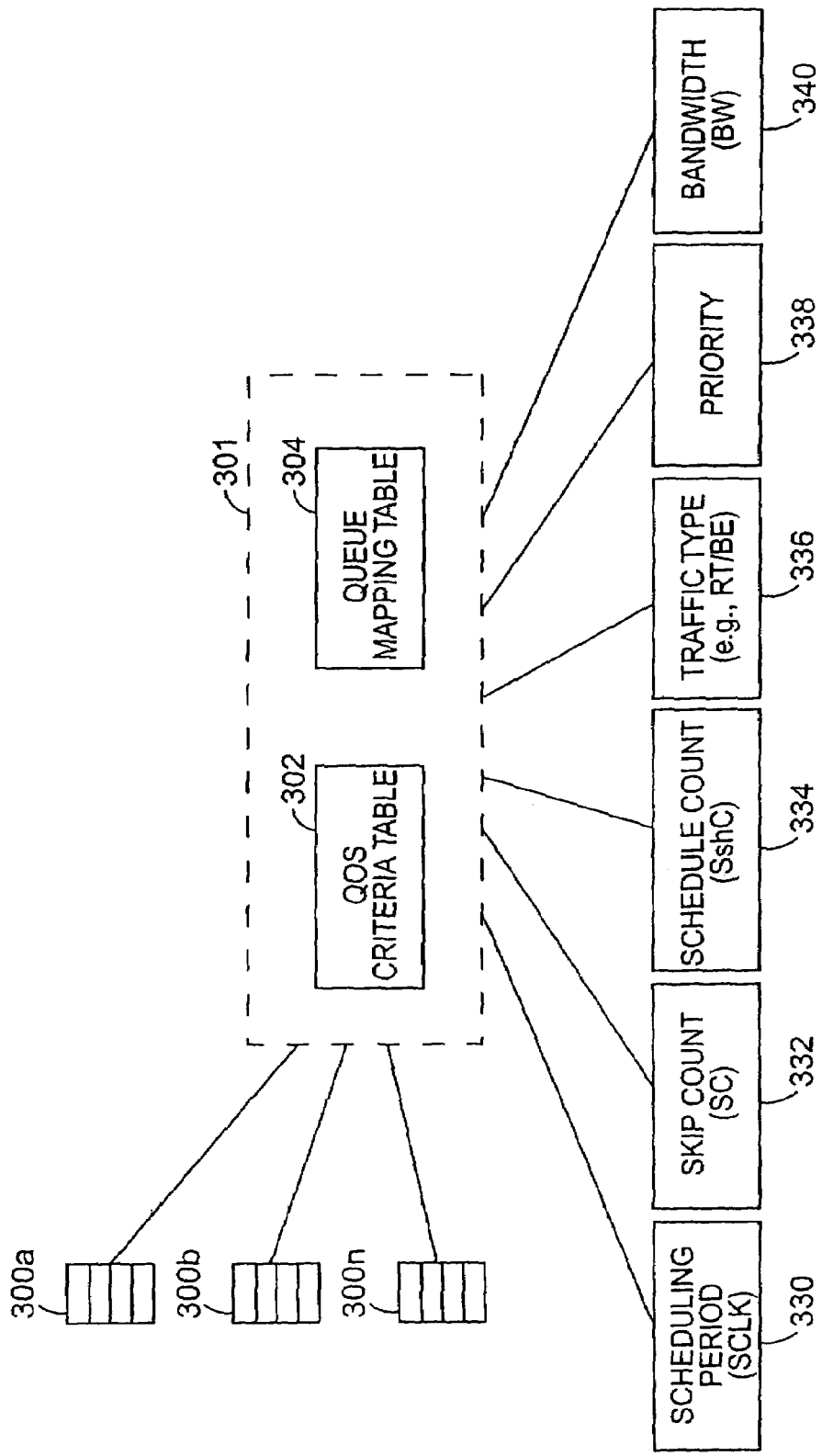
FIG. 4 is a block diagram showing a portion of a scheduler including a number of programmable tables and traffic parameters for shaping network traffic in accordance with an embodiment of the present invention.
Figure 5:
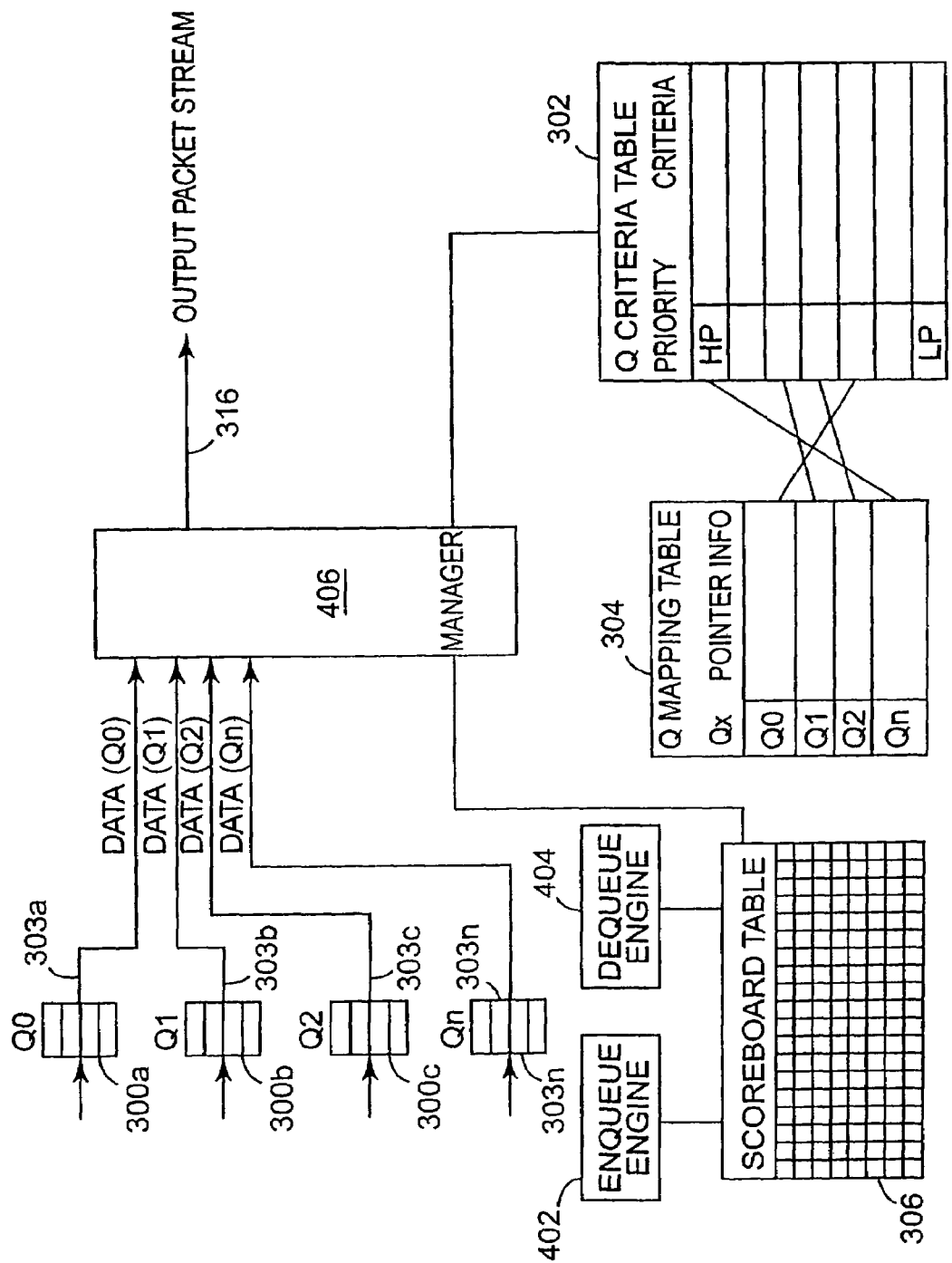
FIG. 5 is a block diagram of a scheduling system including a number of programmable tables and traffic parameters for shaping network traffic in accordance with an embodiment of the present invention.

FIG. 4 illustrates a number of traffic parameters that can be programmed and dynamically adjusted to shape the traffic passing through the system as desired. The scheduling period timer 310 controls the scheduling time period (SCLK) 330. The scheduling time period (SCLK) 330 can be set to a desired duration by programming the scheduling period timer 310 appropriately. The scheduling time period (SCLK) 330 controls the main scheduling loop, allowing for a coarse real time control to the scheduler 301 for real time traffic where the latency and jitter of the traffic are important considerations. Other traffic parameters, such as the Skip Count (SC) 332 and Schedule Count (SchC) 334, for example, programmed into the criteria table 302 allow for finer real time control, and further provides for a best effort mode where the queues 300 are scheduled in a weighted best effort fashion.

The scheduling period timer 310 and state machines 312 cooperate with the criteria table 302 to schedule the data received by the queues 300a–n during each scheduling time period (SCLK) 330 in accordance with other traffic parameters. With the exception of the scheduling time period (SCLK) 330, which is determined by the scheduling period timer 310, the other traffic parameters shown in FIG. 4 are stored in, or otherwise established by use of, the criteria table 302. The traffic parameters shown in FIG. 4 include a Skip Count (SC) 332, a Schedule Count (SchC) 334, a traffic type 336, a priority 338, and a bandwidth (BW) 340 parameter. These traffic parameters 332, 334, 336, 338, 340, including the scheduling time period (SCLK) 330, are programmable and dynamically alterable.

Two traffic parameters, the Skip Count (SC) 332 and Schedule Count (SchC) 334, are particularly influential in determining if a particular queue 300 is eligible for scheduling during the current scheduling decision. The Skip Count (SC) 332 is used to skip a programmed number of scheduling time periods (SCLK) 330. A particular queue 300 is skipped (i.e., not scheduled) during a programmed scheduling time period (SCLK) 330 in accordance with the Skip Count (SC) 332 programmed in the criteria table entry associated with the particular queue 300.

The Schedule Count (SchC) 334 is used to specify the number of times a particular queue 300 associated with a particular criteria table entry is eligible for scheduling during the current scheduling time periods (SCLK) 330. All queues 300 with data available will be scheduled once before queues 300 with a Schedule Count (SchC) 334 greater than 1 (SchC>1) will be scheduled again within the same scheduling time period (SCLK) 330. The Schedule Count (SchC) traffic parameter allows a bandwidth bound to be placed on any queue, as will be seen in the illustrative example depicted in FIG. 11.

A traffic type parameter 336 is used to identify the particular traffic type of a particular queue 300 associated with a particular criteria table entry. For example, the traffic type parameter 336 may identify a particular queue 300 associated with a particular criteria table entry as a real time or best effort traffic type. In general, queues 300 marked as real time always have priority over best effort queues 300 at the start of a new scheduling time period (SCLK) 330, thus allowing for a strict TDM scheduling mode.

Figure 6:
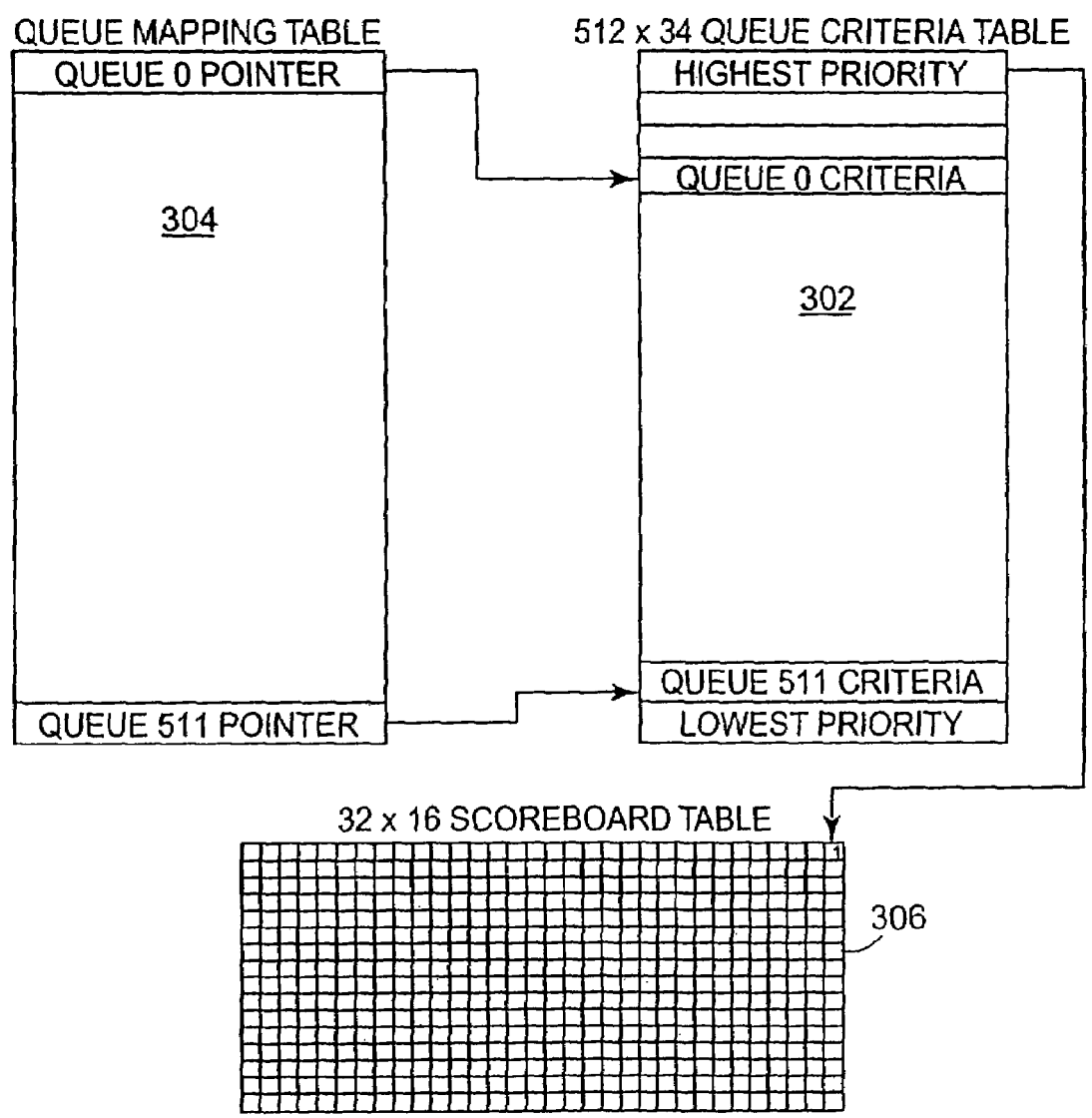
FIG. 6 is a block diagram showing a portion of the scheduling system depicted in FIG. 5.

A priority traffic parameter 338 governs criteria table entry priority based on the positional relationship of criteria table entries relative to one another. As best seen in FIG. 6, the criteria table 302 is organized such that the queue numbers having the highest priority are located toward the top of the criteria table 302 beginning at criteria table entry 0. The queue numbers having the lowest priority are located toward the bottom of the criteria table 302, with the lowest priority queue number residing at criteria table entry 511. The position or order of criteria table entries, and, therefore, the priority of queues associated with the criteria table entries, can be determined based on a number of factors, including connection type, type of protocol, traffic type, logical configuration of the system (e.g., number of output ports, number of input queues), and the like.

The bandwidth (BW) traffic parameter 340 governs the amount of data that is to be scheduled for each scheduling decisions. The bandwidth (BW) traffic parameter 340 can be preprogrammed to determine the amount of data to be transferred during each scheduling decision in terms of bytes, cells or packets. The scheduler 301 limits the amount of data transferred during each scheduling decision according to the bandwidth (BW) 340. The programmed bandwidth (BW) 340 may be greater than the size of a current transfer candidate. In such a case, the scheduler 301 continues to select the same queue for transfer until either the scheduler 301 has no more packets available to schedule or it has met or exceeded the bandwidth (BW) requirement for this queue. The size of the packet may be greater than the programmed bandwidth (BW) 340, in which case a deficit is required when scheduling packets or cells, as will be discussed in greater detail below.

Figure 7:
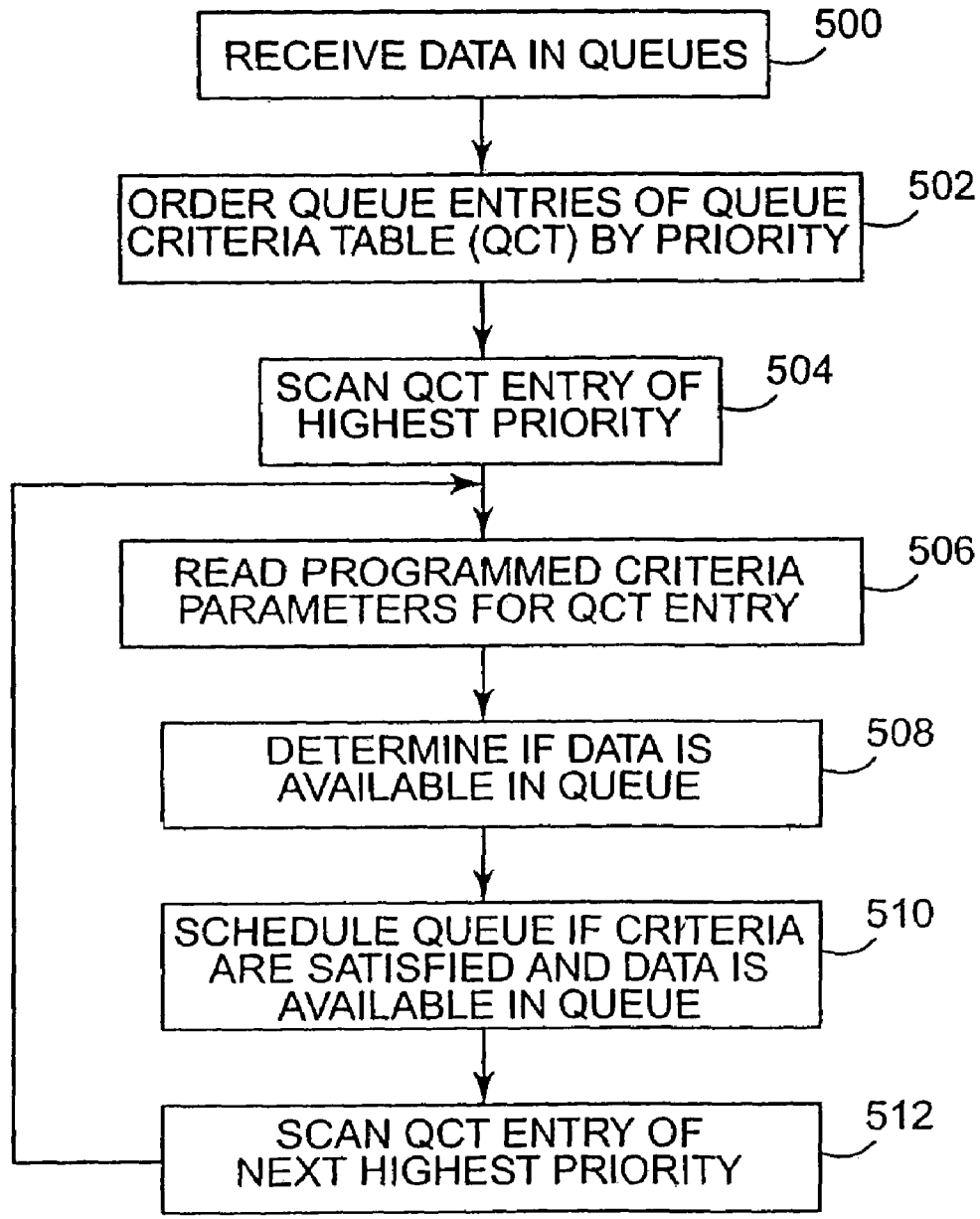
FIG. 7 illustrates various operations involving the scheduling of data queues in accordance with an embodiment of the present invention.

Referring now to FIG. 7, there is illustrated several operations involving the scheduling of data for a number of queues 300 in accordance with the general principles of the present invention. As is shown in FIG. 7, data (e.g., cells of data) is received in the queues 500. The cells are typically transferred to the appropriate queues 300 by an enqueue engine 402 based on destination and quality of service (QoS) characteristics. The criteria table 302 is scanned 504 beginning with the highest priority criteria table entry. The programmed criteria parameters (i.e., traffic parameters) are read 506 for the highest priority criteria table entry.

A check is made to determine 508 if data is available in the queue associated with the highest priority criteria table entry. The queue associated with the highest priority criteria table entry is scheduled 510 if the criteria parameters are or can be satisfied and data is available in the associated queue. The criteria table 302 is scanned to locate the next highest criteria table entry 512. The operations associated with blocks 506 through 510 are repeated for the next highest criteria table entry until the lowest criteria table entry is processed.

Figure 8:
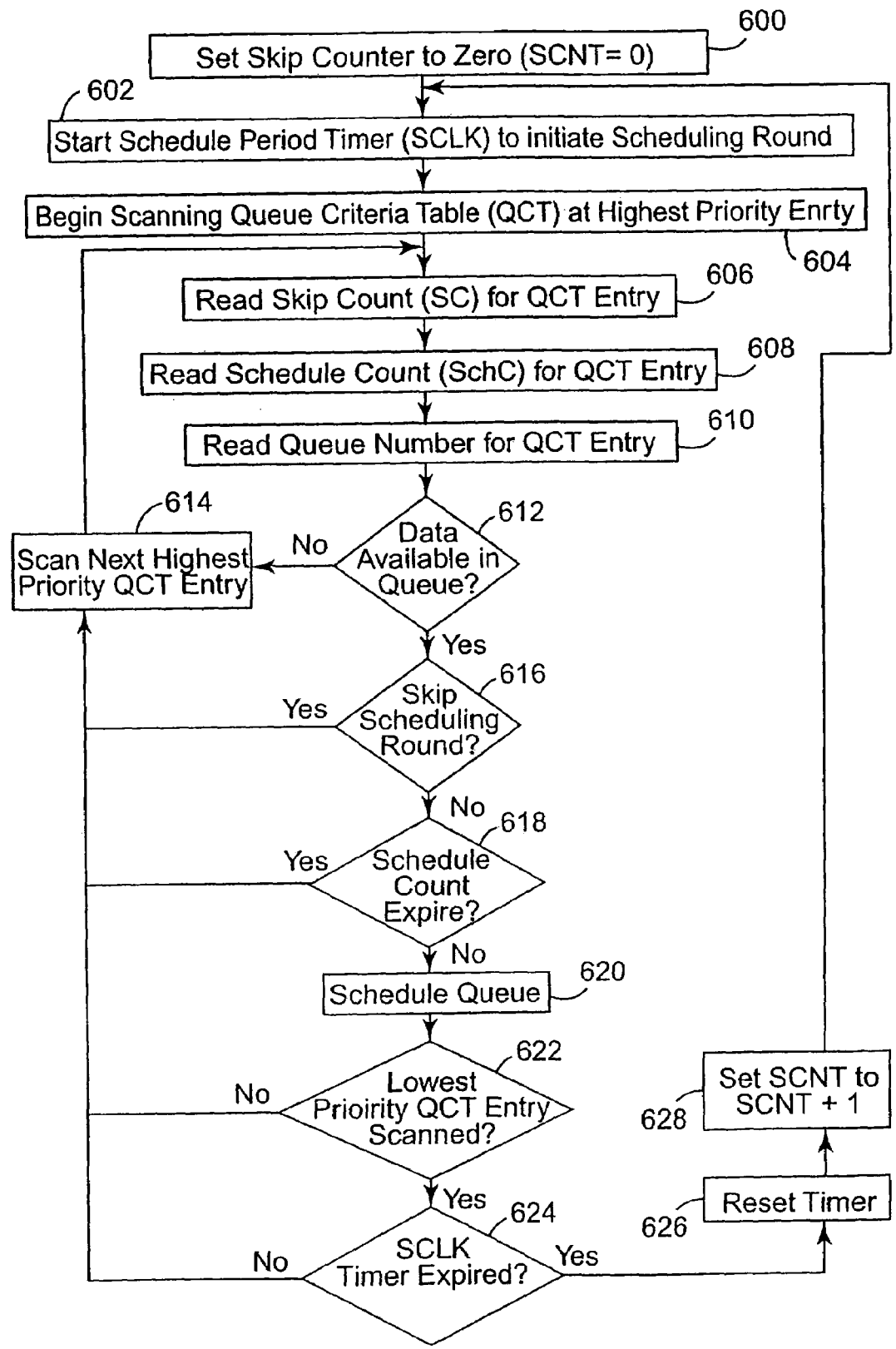
FIG. 8 illustrates various operations involving the scheduling of data queues in accordance with another embodiment of the present invention.

FIG. 8 illustrates several operations involving the scheduling of data for a number of queues 300 in accordance with one particular embodiment of the present invention. As is shown in FIG. 8, a Skip Counter is initially set 600 to zero (SCNT=0). The scheduling period timer 310 is initiated 602 to start the current scheduling round having a duration defined by the scheduling time period (SCLK) 330. Scanning of the criteria table 302 is initiated 604 at the highest priority criteria table entry. The Skip Count (SC) 332 and Schedule Count (SchC) 334 are read 606, 608 for the current criteria table entry. The identity or number of the queue 300 mapped to the current criteria table entry is also read 610.

A check 612 is made to determine if data is available in the queue 300 mapped to the current criteria table entry. If data is not available in the queue 300 mapped to the current criteria table entry, the next highest criteria table entry is scanned 614 and blocks 606 through 612 are repeated. In an embodiment in which the scoreboard table 306 is used to determine queue data availability, the only criteria table entries subject to scanning and further processing are those having data available as indicated by the scoreboard table 306. In such an embodiment, the data availability checks associated with blocks 612 and 614 can be excluded.

If data is available in the queue 300 mapped to the current criteria table entry, a check is made 616 to determine if the current criteria table entry is to be skipped during a specified scheduling time period (SCLK) 330 as indicated by the Skip Count (SC) read for the current criteria table entry. The next highest criteria table entry is scanned 614 if the Skip Count (SC) indicates that the current criteria table entry is to be skipped.

If not skipped, a check is made 618 to determine if the current criteria table entry is to be considered ineligible for scheduling based on the Schedule Count (SchC) read for the current criteria table entry. For example, if the Schedule Count (SchC) for the current criteria table entry is programmed to SchC=1, then the queue 300 mapped to the current criteria table entry is eligible for scheduling only once during the same scheduling time period (SCLK) 330. In this case, the queue 300 mapped to the current criteria table entry is eligible for scheduling only once during the initial scan through the criteria table within the same scheduling time period (SCLK) 330.

According to another example, if the Schedule Count (SchC) for the current criteria table entry is programmed to SchC=4, then the queue 300 mapped to the current criteria table entry is eligible for scheduling up to four times during the same scheduling time period (SCLK) 330. In this case, the queue 300 mapped to the current criteria table entry is eligible for scheduling once during the initial scan through the criteria table and three additional times during subsequent scans through the criteria table within the same scheduling time period (SCLK) 330.

By way of further example, if the Schedule Count (SchC) for the current criteria table entry is programmed to SchC=0, then the queue 300 mapped to the current criteria table entry is eligible for scheduling up to an unbounded (unlimited) number of times during the same scheduling time period (SCLK) 330. In this case, the queue 300 mapped to the current criteria table entry is eligible for scheduling as many times as is possible during the same scheduling time period (SCLK) 330, in view of priority and criteria settings of other queues 300 eligible for scheduling. Criteria table entries programmed with SchC=0 are subject to repeated scheduling interlaced with the scheduling of other criteria table entries programmed with SchC>0.

If the Schedule Count (SchC) for the current criteria table entry has not expired 618, then the queue mapped to the current criteria table entry is scheduled 620. The processes of blocks 606 through 620 are repeated for all criteria table entries in descending priority order until the lowest priority criteria table entry is scanned and processed 622. If the scheduling time period (SCLK) 330 has not yet expired 624, the processes of blocks 606 through 622 are repeated for criteria table entries in descending priority order until the scheduling time period (SCLK) 330 has expired.

In an alternative approach, a scan through the criteria table subsequent to the initial scanning loop need not begin at the criteria table entry having the highest priority. After completion of the first scan through the criteria table, for example, and within a particular scheduling time period (SCLK), the scheduler 301 can be programmed to jump to the last pointer set from the previous scheduling loop (i.e., last criteria table entry processed at the termination of the previous scheduling time period (SCLK)), instead of continuing in the manner previously described. This approach may be used to ensure fairness among similarly weighted traffic across multiple scheduling periods.

After the scheduling time period (SCLK) 330 has expired 624, the scheduling time period (SCLK) is reset. The Skip Counter is then incremented 628 by setting SCNT=SCNT+1. The scheduling time period (SCLK) is initiated 602 and a subsequent scheduling round begins. The processes of blocks 604 through 628 are repeated for a duration determined by the scheduling time period (SCLK) 330 for subsequent scheduling rounds.

Figure 9:
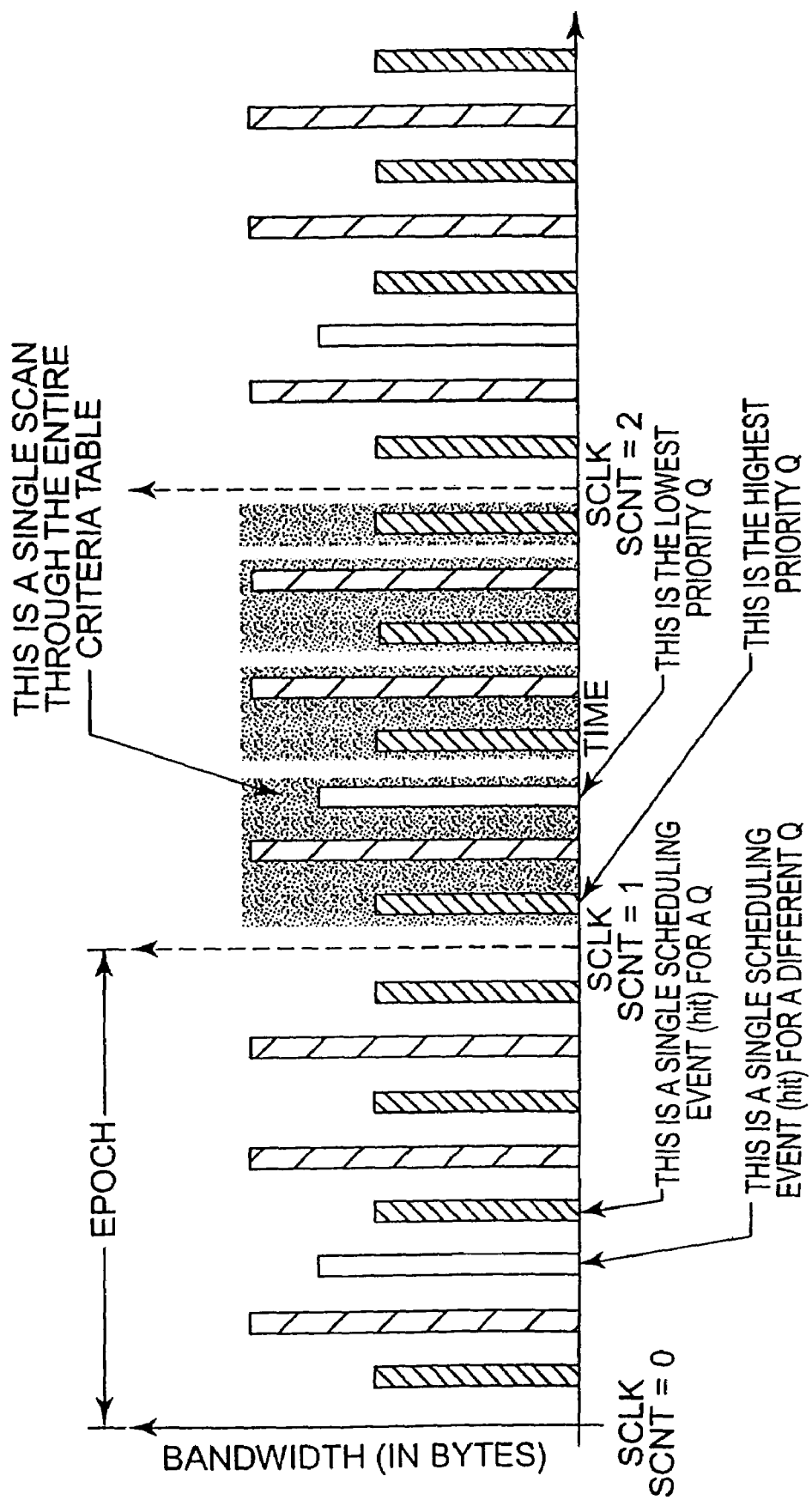
FIG. 9 is a graphical illustration of scheduling activities divided into scheduling time periods or epochs, and the effect of various programmable traffic parameters on the scheduling of queues in accordance with an embodiment of the present invention.
Figure 10:
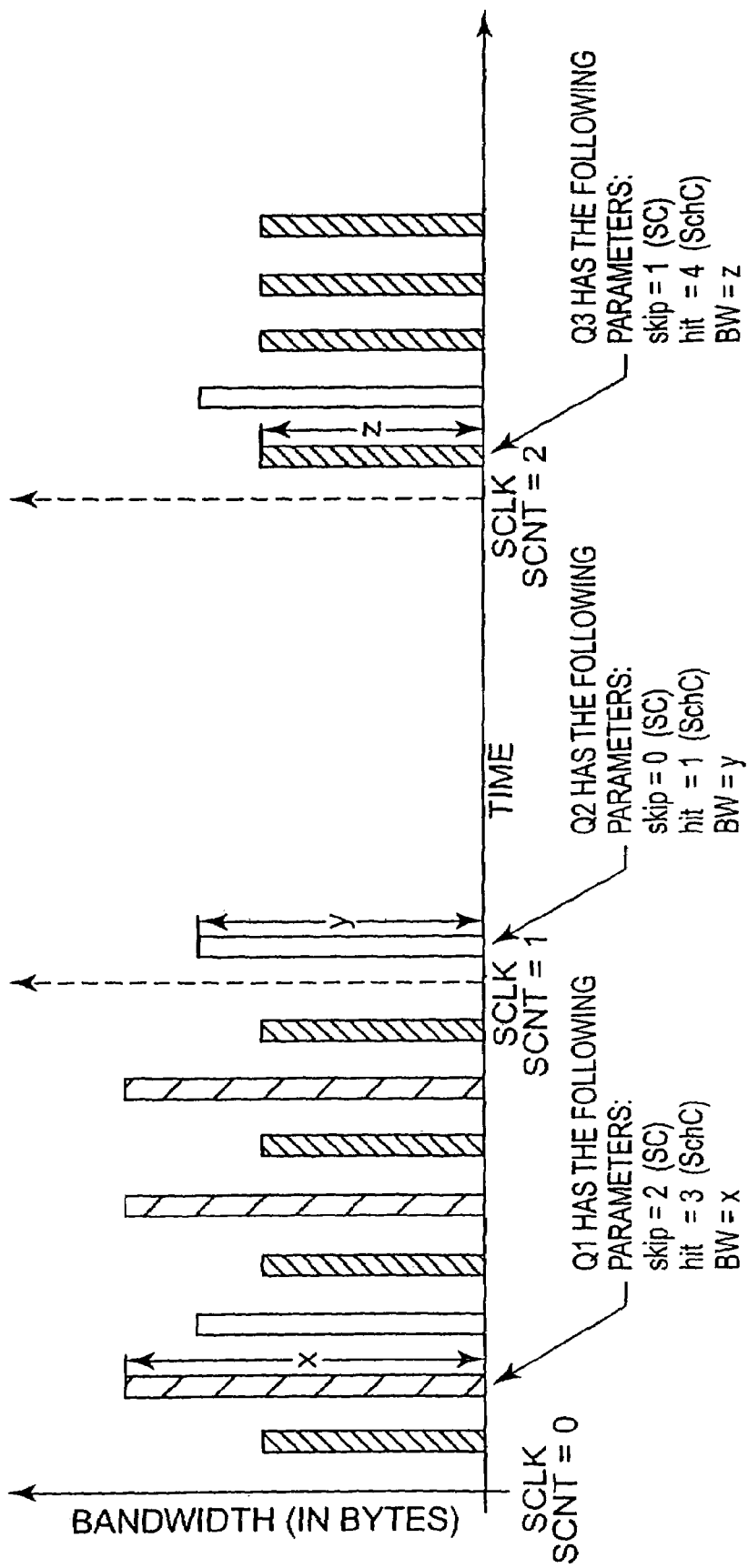
FIG. 10 is a graphical illustration of scheduling activities divided into scheduling time periods or epochs, and the effect of various programmable traffic parameters having specified exemplary values on the scheduling of queues in accordance with an embodiment of the present invention.
Figure 11:
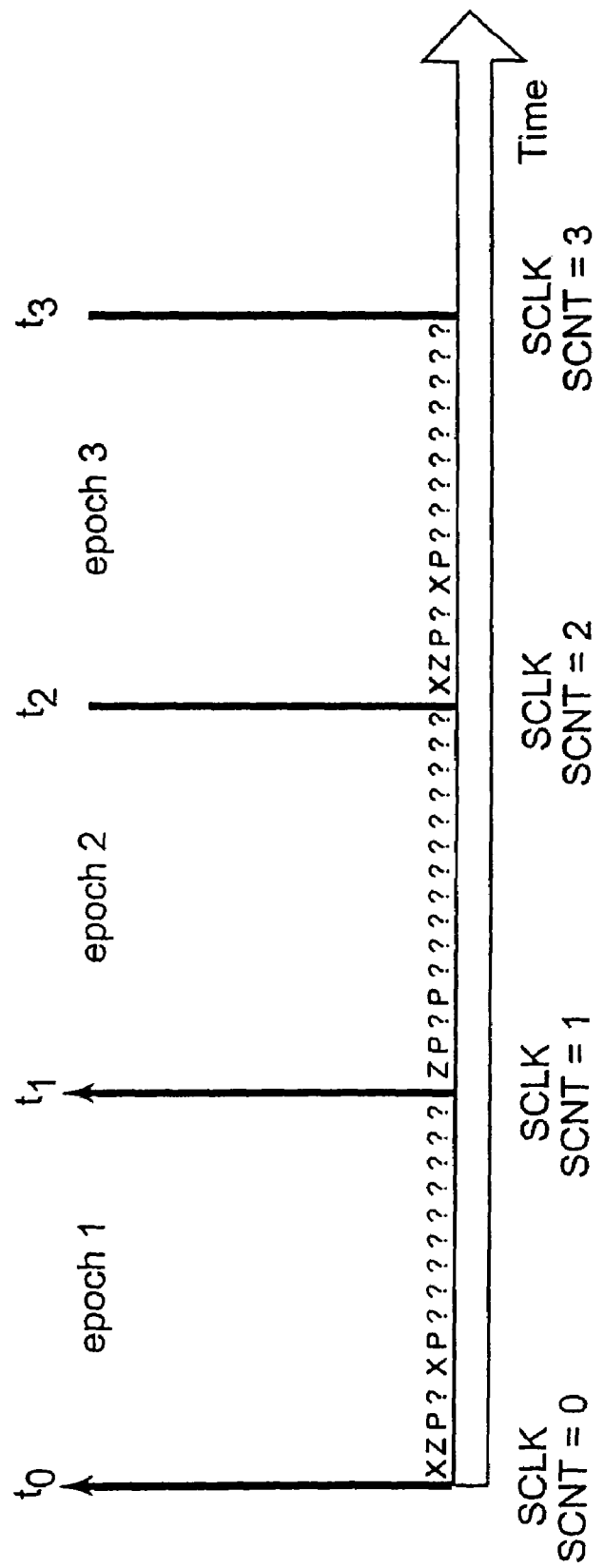
FIG. 11 is a graphical illustration of scheduling activities divided into scheduling time periods or epochs, and the scheduling of queue data governed by various programmable traffic parameters having specified exemplary values in accordance with an embodiment of the present invention.

FIGS. 9–11 illustrate various aspects and results of a scheduling methodology carried out in accordance with the principles of the present invention. As is shown in FIG. 9, scheduling activity is divided into scheduling time periods (SLCK) or epochs. The scheduler 301 uses an epoch as the basis for scheduling queues 300 for transfer. As was previously described, during an epoch, the scheduler 301 scans several tables (e.g., criteria and mapping tables 302, 304) that contain the state of each queue to find the next candidate to select for transfer. Each entry in these tables corresponds to a queue that the scheduler 301 manages, and the entries in the tables are sorted by priority starting with the highest priority queue and progressing to the lowest priority queue. At the beginning of an epoch, the scheduler 301 starts with the highest priority queue and continuously scans these tables looking for the highest priority queue that is ready for transfer.

A "hit" is a single scheduling event within an epoch. A queue can have more than one hit per epoch. However, if the scheduler 301 has other queues ready for transfer, the scheduler 301 does not select the same queue until it scans all other queues. The scheduler 301 also has to consider the bandwidth (BW) requirement within a scheduling hit.

Figure 12:
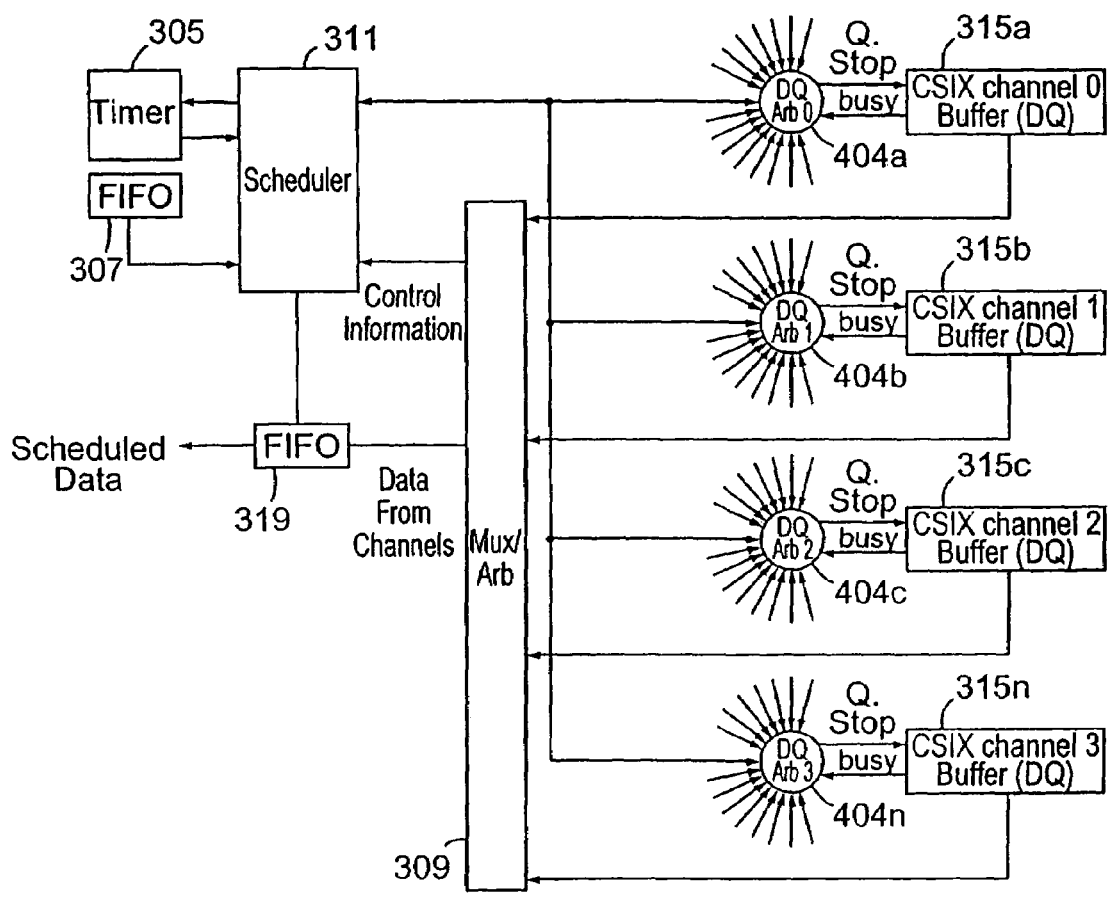
FIG. 12 is a block diagram of an egress scheduling apparatus in accordance with an embodiment of the present invention.

For egress scheduling, packets for a single queue are spread over several channels, such as the four CSIX channels 315 shown in FIG. 12. During a scheduling hit, a queue has a preprogrammed amount of data to transfer or bandwidth (BW). This bandwidth (BW) may be greater than the size of current transfer candidate, so the egress scheduler 311 continues to select the same queue for transfer (moving from channel to channel) until either the scheduler 311 has no more packets available to schedule or the scheduler 311 has met or exceeded the bandwidth (BW) requirement for this queue.

In order to police bandwidth (BW) usage, the egress scheduler 311 tracks the excess bandwidth (BW) used during a transfer as a deficit. The scheduler 311 carries this deficit to the next scheduling event for the queue. When the scheduler 311 selects this queue again, the scheduler 311 reduces the allocated bandwidth (BW) by the deficit the queue incurred during the last transfer.

For an egress scheduler 311 of the type shown in FIG. 12, a logical FIFO 307 signals its scheduler 311 when the FIFO 307 reaches its high-water mark. The scheduler 311 stops the dequeue engine 404 from performing the transfer into the FIFO 307 and waits until the FIFO 307 drains down. The scheduler 311 does not abandon a transfer candidate in this case, but waits until the FIFO 307 can accept more data, and then the scheduler 311 restarts the same transfer. When a dequeue engine 404 receives this stop signal, the dequeue engine 404 disengages with this scheduler 311 and can start a transfer for another egress scheduler 311n (not shown).

When the dequeue arbiter 404 receives the stop signal and the dequeue engine 404 drops to a busy state, the dequeue arbiter 404 starts arbitration to find more work for this dequeue engine 404. The arbitration algorithm ignores any egress scheduler 311 that is flow controlled. Data from the channels 315 is transferred to a FIFO 319 via a multiplexer/arbitrator 309 and output from FIFO 319 as scheduled data.

In the illustrative embodiment of FIG. 10, the results of a scheduling operation are shown in graphical form. In the context of FIG. 10, it is assumed that the scheduler 301 uses the following four parameters for determining when it can select a candidate queue for transfer:

| | |
|---|---|
| Priority: | The scheduler 301 selects the highest priority queues first. |
| Skip Count: | This parameter sets the number of epochs the scheduler 301 skips before considering the queue for transfer. |
| Hit: | The number of hits that a queue has available to it determines the number of times in a single epoch a scheduler 301 can select a queue for transfer. Hit is analogous to Schedule Count (SchC) discussed previously. |
| Bandwidth: | This parameter determines how much data to transfer for each scheduling hit. |

The following formula may be used to determine the data rate for a single queue per epoch:

$$\text{data rate} = \frac{\text{hit} \times BW}{(\text{skip} + 1) \times \text{epoch length}}$$

A scheduler 301 only selects queues that have at least one complete packet. FIG. 10 shows how three different queues (Q) could be scheduled. Q1 has a Skip Count (SC), referred to generically as a Skip parameter, set to two. As such, the scheduler 301 can select Q1 in the first and forth epochs, skipping the two epochs in between. Q1 also has its Hit parameter set to three, so the scheduler 301 can select Q1 three times in any epoch that is not skipped. Finally, Q1 has a bandwidth (BW) set to x, which means the scheduler 301 allows transfers up to x number of bytes for each scheduling event (hit). Since Q1 has a lower priority than Q3, but a higher priority than Q2, the scheduler 301 selects Q1 after Q3, but before Q2.

For Q2, the Skip parameter is set to zero, and the scheduler 301 does not skip any epochs when considering Q2 for transfer. It can be seen that the scheduler 301 has selected Q2 in every epoch. Q2 also has the Hit parameter set to one, meaning the scheduler 301 only selects Q2 once per epoch. Q2 has a bandwidth (BW) set to y, so the scheduler 301 keeps selecting Q2 until the dequeue engines 404 transfer y number of bytes. The scheduler 301 selects Q3 for transfer every other epoch since its Skip parameter is set to one. In each eligible epoch, the scheduler 301 selects Q3 four times, because its Hit parameter is set to four. Finally, when the scheduler 301 requests transfers for Q3, the scheduler 301 requests as many transfers in a single scheduling hit until the dequeue engines 404 transfer z number of bytes.

FIG. 11 illustrates how a mixture of real time and best effort traffic would be scheduled based on the criteria table settings indicated as follows:

| | |
|---|---|
| Q0 (X) Parameters: SC = 1 | SchC = 2 |
| Q1 (Z) Parameters: SC = 0 | SchC = 1 |
| Q2 (P) Parameters: SC = 0 | SchC = 2 |
| Q3 (?) Parameters: SC = 0 | SchC = 0 |

The illustrative example of FIG. 11 assumes that data is always available for scheduling in queues Q0–Q3. Queues Q0 and Q1 are assigned as real time queues. Queues Q2 and Q3 are assigned as best effort queues. Q0 has a priority higher than Q1, and Q2 has a priority higher than Q3.

The scheduling results in the first epoch, defined between times $t_o$ and $t_1$, show that the data of Q0 (i.e., X) is scheduled first during the first epoch because of Q0's priority relative to Q1, Q2, and Q3. The data of Q0 is scheduled a second time during the first epoch as a result of having been assigned a Schedule Count (SC) of 1.

The second queue to be scheduled in the first epoch is Q1 because of Q1's priority relative to Q0, Q2 and Q3. The data of Q1 (i.e., Z) is not scheduled a subsequent time during the first epoch as a result of having been assigned a Schedule Count (SC) of 1.

Q2 is scheduled third during the first epoch because of Q2's priority relative to Q0, Q1, and Q3. The data of Q2 (i.e., P) is scheduled a second time during the first epoch as a result of having been assigned a Schedule Count (SC) of 2.

The last queue to be scheduled in the first epoch is Q3 because Q3 has been assigned the lowest priority for the queues. The data of Q3 (i.e., ?) is scheduled an unbounded number of times during the first epoch, subject to the priority and criteria settings of other queues eligible for scheduling during the first epoch, as a result of having been assigned a Schedule Count (SC) of 0. It can be seen that the subsequent repeated scheduling of Q3 occurs only after the queues having non-zero Schedule Counts (SC) and satisfied criteria are processed (i.e., Q0 and Q2, both of which have Schedule Counts (SC) of 2).

Scheduling of queues Q0–Q3 proceeds in a like fashion in epochs 1–3 according to the priority, Skip Count (SC), and Scheduling Count (SchC) parameters programmed in the criteria table and associated with these queues. With regard to epoch 2, it is noted that Q0 is skipped due to Q0 having been assigned a Skip Count (SC) of 1.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of scheduling data, comprising:
   for each of a plurality of criteria entries,
      initializing a plurality of alterable traffic parameters; and
      ordering the plurality of criteria entries to achieve a desired set of traffic characteristics;
   receiving variable length data by a plurality of queues;
   mapping each queue in the plurality of queues to a selected one of the plurality of criteria entries;
   reading the plurality of alterable traffic parameters associated with the selected one of the plurality of criteria entries corresponding to each queue in the plurality of queues, the read alterable traffic parameters selected to associate a particular queue with a particular portion of the desired set of traffic characteristics;
   scheduling the queues to output the received data using the read alterable traffic parameters and the ordering of the criteria entry corresponding to the read alterable traffic parameters; and dynamically modifying the plurality of alterable traffic parameters in the plurality of criteria entries and the ordering of the plurality of criteria entries to update the desired set of traffic characteristics before repeating the steps of receiving variable length data through scheduling the queues.

2. The method of claim 1, wherein the traffic parameters are alterable to associate a particular queue with a particular Quality of Service (QOS).

3. The method of claim 1, wherein the traffic parameters are alterable to associate a particular queue with a particular traffic type.

4. The method of claim 3, wherein the particular traffic type comprises at least a real lime traffic type and a best effort traffic type.

5. The method of claim 1, wherein the traffic parameters are alterable to alter a scheduling prioritization of the queues.

6. The method of claim 1, further comprising mapping a set of alterable traffic parameters to each of the queues.

7. The method of claim 6, further comprising altering the mapping of the set of alterable traffic parameters.

8. The method of claim 6, further comprising altering the set of alterable traffic parameters.

9. The method of claim 1, wherein the plurality of queues comprise ingress queues or egress queues.

10. An apparatus for scheduling data, comprising:
means for dynamically creating a plurality of criteria entries;
means for initializing and dynamically modifying a plurality of alterable traffic parameters corresponding to each of the plurality of criteria entries to achieve a desired set of traffic characteristics;
means for receiving variable length data by a plurality of queues;
means for mapping each of the plurality of queues to a selected one of the plurality of criteria entries;
means for reading a plurality of alterable traffic parameters associated with each of the plurality of queues, the alterable traffic parameters selected from the criteria entries associated with a particular queue with representing at least a particular portion of the desired set of traffic characteristics; and
means for scheduling the queues to output the received data using the read alterable traffic parameters.

11. The apparatus of claim 10, wherein the traffic parameters are alterable to associate a particular queue with a particular Quality of Service (QOS).

12. The apparatus of claim 10, wherein the traffic parameters are alterable to associate a particular queue with a particular traffic type.

13. The apparatus of claim 12, wherein the particular traffic type comprises at least a real time traffic type and a best effort traffic type.

14. The apparatus of claim 10, wherein the traffic parameters are alterable to alter a scheduling prioritization of the queues.

15. The apparatus of claim 10, further comprising means for mapping a set of alterable traffic parameters to each of the queues.

16. The apparatus of claim 15, further comprising means for altering the mapping of the set of alterable traffic parameters.

17. The apparatus of claim 15, further comprising means for altering the set of alterable traffic parameters.

18. The apparatus of claim 10, wherein the plurality of queues comprise ingress queues or egress queues.

* * * * *